United States Patent Office 2,920,803
Patented Jan. 12, 1960

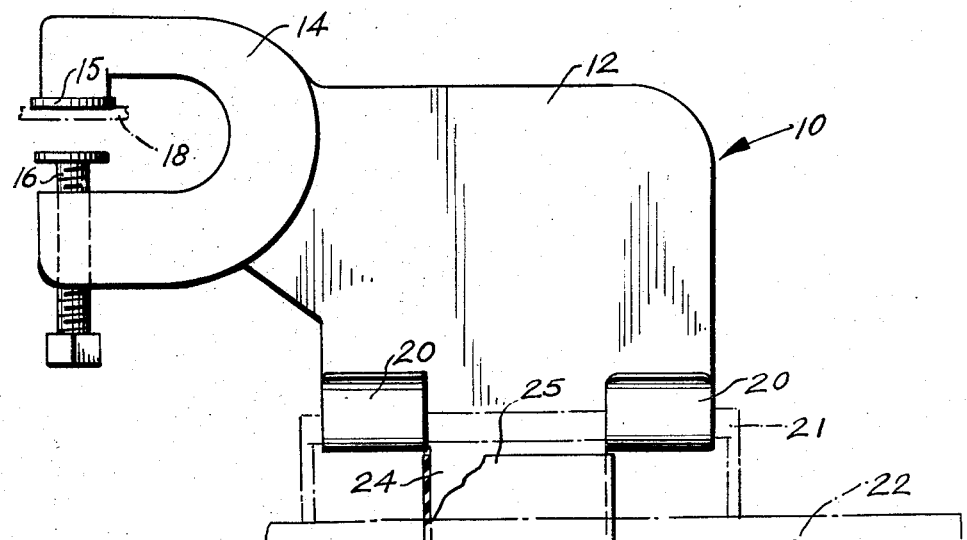
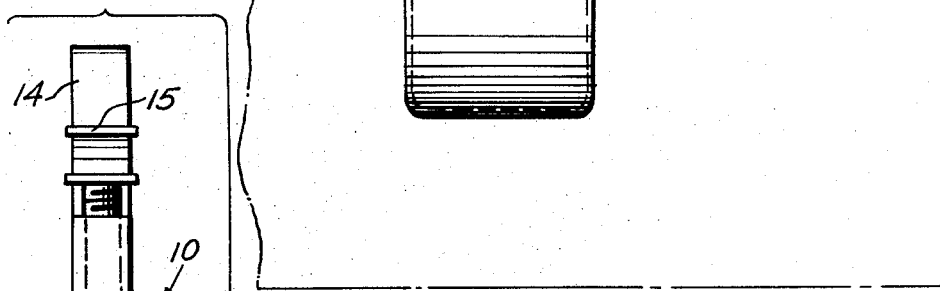
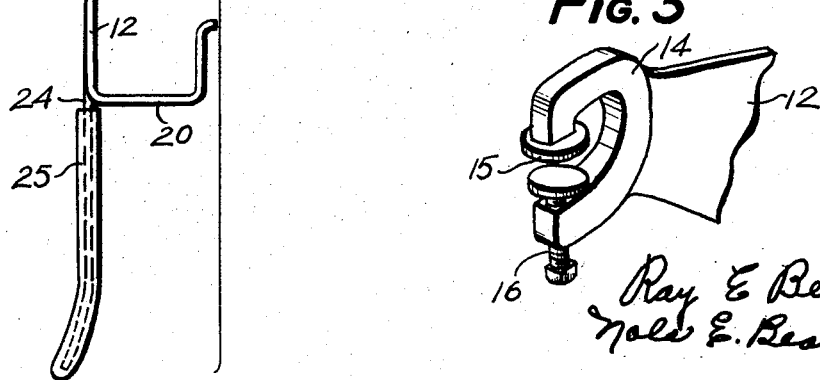
INVENTOR.
Ray E. Bearbower
Nold E. Bearbower

2,920,803
LUNCH KIT HOLDER

Ray E. Bearbower and Nola E. Bearbower, Santa Ana, Calif., assignors of one-tenth to Gadget-of-The-Month Club, Inc., North Hollywood, Calif., a corporation of California Application February 7, 1958, Serial No. 713,844

1 Claim. (Cl. 224—42.45)

This invention relates to automotive vehicles and more particularly to an accessory therefor.

It is an object of the present invention to provide a lunch kit holder for attachment to the dashboard of a vehicle for supporting a lunch kit in an upright position within the vehicle at all times, and for preventing the tilting or spilling of the contents therefrom.

Another object of the present invention is to provide a lunch kit holder of the above type which may be selectively secured within the vehicle either parallel to or transversely of the longitudinal axis of the vehicle, such device also having means for limiting the rocking and swinging of the lunch kit during movement of the vehicle.

Other objects of the invention are to provide a lunch kit holder for automotive vehicles bearing the above objects in mind which is of simple construction, has a minimum number of parts, is inexpensive to manufacture and efficient in operation.

For other objects and for a better understanding of the invention, reference may be had to the following detailed description taken in conjunction with the accompanying drawing, in which:

Figure 1 is a front elevational view of a lunch kit holder made in accordance with the present invention in operative use;

Figure 2 is a side elevational view of the device shown in Figure 1; and

Figure 3 is a fragmentary perspective view of certain parts of the apparatus shown in Figure 1.

Referring now more in detail to the drawing, a lunch kit holder 10 made in accordance with the present invention is shown to include a main plate 12 having the yoke 14 of a C-clamp secured to one corner thereof. This C-clamp is provided with a stationary anvil 15 and a threadedly supported bolt 16 for clamping a flange or other portion 18 of the vehicle dashboard therebetween. The opposite edge of the main plate 12 is provided with a pair of longitudinally spaced apart and upwardly opening shallow spring clip fingers 20 for releasably supporting the handle 21 of a lunch kit 22. A downwardly depending bumper assembly including a plate 24 that forms a downward extension of the main plate 12 is completely encased within a flexible sheath of resilient material 25. This bumper unit limits swinging movement of the lunch kit upon the supporting fingers 20 so as to prevent scratching and denting of the exterior surface.

In actual use, the bracket may be clamped to a suitable portion of the vehicle dashboard in either the longitudinal or transversely extending direction, depending upon the size of the dashboard and the foot room that is desired. Normally, this device will extend out of the path of movement of the driver's feet and out of the way of any passengers. Thus, it is only necessary to engage the handle 21 of the lunch kit 22 upon the supporting spring clip fingers 20 so that the lunch kit will be constantly maintained in the proper upright position so that any contents will not be tilted or spilled as the car travels around curves and bumpy roads. Because of its neat and compact design, the use of such holder does not detract from the appearance of the vehicle and in no way interferes with the proper driving thereof.

While various changes may be made in the detail construction, it shall be understood that such changes shall be within the spirit and scope of the present invention as defined by the appended claim.

What we claim as new and desire to protect by Letters Patent of the United States is:

A lunch kit holder for automotive vehicles comprising, in combination, a main flat vertical plate, a clamp secured to one side edge of said main plate and comprising a C-clamp having a fixed anvil and a vertically threadedly carried bolt for releasably clamping a flange of a vehicle dashboard therebetween, bracket means comprising a pair of longitudinally spaced apart and upwardly opening finger clips fixedly secured to the bottom edge of said main plate and laterally offset therefrom for releasably supporting the handle of a lunch kit, and bumper means depending from the bottom edge of said main plate and comprising a substantially flat vertically downwardly directed extension of said main plate intermediate of and extending downwardly below said finger clips into a position for lateral gravity-caused abutment thereof by the side of a lunch kit having its handle supported by said finger clips for limiting swinging movement of the lunch kit, and a sheath of flexible resilient material enclosing said flat downwardly depending extension of said main plate for non-marring frictional contact with the side of a supported lunch kit.

References Cited in the file of this patent

UNITED STATES PATENTS

| | | |
|---|---|---|
| 2,500,838 | Le Vine | Mar. 14, 1950 |
| 2,526,322 | Black | Oct. 17, 1950 |
| 2,628,051 | Anderson | Feb. 10, 1953 |

FOREIGN PATENTS

| | | |
|---|---|---|
| 286,078 | Great Britain | Mar. 1, 1928 |